(12) United States Patent
Tohmyoh et al.

(10) Patent No.: US 8,887,584 B2
(45) Date of Patent: Nov. 18, 2014

(54) LOAD MEASURING APPARATUS

(75) Inventors: Hironori Tohmyoh, Sendai (JP); Md. Abdus Salam Akanda, Sendai (JP)

(73) Assignee: Tohoku University, Sendai (JP)

( * ) Notice: Subject to any disclaimer, the term of this patent is extended or adjusted under 35 U.S.C. 154(b) by 414 days.

(21) Appl. No.: 13/144,862

(22) PCT Filed: Nov. 19, 2009

(86) PCT No.: PCT/JP2009/069612
§ 371 (c)(1),
(2), (4) Date: Aug. 17, 2011

(87) PCT Pub. No.: WO2010/084662
PCT Pub. Date: Jul. 29, 2010

(65) Prior Publication Data
US 2011/0296929 A1    Dec. 8, 2011

(30) Foreign Application Priority Data
Jan. 20, 2009  (JP) ................. 2009-010322

(51) Int. Cl.
G01L 1/04  (2006.01)
G01L 1/14  (2006.01)
G01Q 20/02  (2010.01)
B82Y 35/00  (2011.01)

(52) U.S. Cl.
CPC ............ *G01Q 20/02* (2013.01); *G01L 1/044* (2013.01); *G01L 1/142* (2013.01); *B82Y 35/00* (2013.01)
USPC .................................... 73/862.626

(58) Field of Classification Search
CPC ........ B82Y 35/00; G01L 1/044; G01L 1/142; G01Q 20/02
USPC ...................... 29/526; 73/104, 105
See application file for complete search history.

(56) References Cited

U.S. PATENT DOCUMENTS 3,199,345 A    8/1965  Lee et al.
5,489,774 A *  2/1996  Akamine et al. ............ 250/234
(Continued)

FOREIGN PATENT DOCUMENTS

GB    2271189 A  *  4/1994  ............ G01G 19/08
JP    B1-42-12120    7/1942
(Continued)

OTHER PUBLICATIONS

Translation of International Preliminary Report on Patentability dated Sep. 5, 2011 issued in International Patent Application No. PCT/JP2009/069612.

(Continued)

*Primary Examiner* — Lisa Caputo
*Assistant Examiner* — Brandi N Hopkins
(74) *Attorney, Agent, or Firm* — Oliff PLC

(57) ABSTRACT

A high-accuracy load measuring apparatus capable of enlarging a measurement range includes a loading section provided at one end of a long and narrow beam. A support supports the beam at a side closer to the other end of the beam than the loading section. A displacement sensor includes a capacitive sensor and is provided to measure a displacement of the loading section. The beam includes a pair of long and narrow plate-like legs arranged in parallel while being spaced apart in a thickness direction and a connecting portion connecting ends of the plate-like legs at a side of the loading section. The beam is supported on the support to have a changeable length between a supported position by the support and the loading section. Each plate-like leg includes a slot, which is a long and narrow hole formed along a length direction in a widthwise central part.

6 Claims, 9 Drawing Sheets

(56) References Cited

U.S. PATENT DOCUMENTS

| | | | |
|---|---|---|---|
| 6,480,286 B1 | 11/2002 | Kubo et al. | |
| 7,106,684 B2 * | 9/2006 | Nam | 369/126 |
| 2001/0049959 A1 * | 12/2001 | Neukermans et al. | 73/104 |
| 2005/0138995 A1 * | 6/2005 | Wilhelm | 73/104 |

FOREIGN PATENT DOCUMENTS

| JP | A-55-90840 | 7/1980 | | |
|---|---|---|---|---|
| JP | A-1-195301 | 8/1989 | | |
| JP | A-2000-283747 | 10/2000 | | |
| JP | B2-3240390 | 12/2001 | | |
| JP | A-2003-42861 | 2/2003 | | |
| JP | 2004205381 A * | 7/2004 | | G01L 1/04 |
| JP | A-2004-205381 | 7/2004 | | |
| JP | A-2006-78219 | 3/2006 | | |
| JP | A-2006-153681 | 6/2006 | | |

OTHER PUBLICATIONS

International Search Report mailed Feb. 2, 2010 issued in International Patent Application No. PCT/JP2009/069612 (with translation).

* cited by examiner (a)

(b)

LOAD MEASURING APPARATUS

TECHNICAL FIELD

The present invention relates to a load measuring apparatus.

BACKGROUND ART

Conventionally, forces in micro and nano ranges have been measured using MEMS (Micro Electro Mechanical Systems) transducers (converters) such as piezo elements, strain gauges, piezo resistors, capacitive and optical force sensors. Piezo element sensors are suitable for detecting dynamic forces, but not suitable for detecting static forces because of their structures. On the contrary, capacitive sensors are excellent in sensitivity and stability as compared with piezo element sensors (see, for example, patent literature 1). Further, optical force sensors are big in construction and expensive, but can realize a most sensitive force measurement in the present circumstances.

Some of conventional MEMS transducers include a cantilever and a laser displacement meter (see, for example, patent literature 2). This MEMS transducer is utilized in atomic force microscopes (AFMs) and the like and constructed such that, when a tip fixed to the leading end of the cantilever comes into contact with a measurement object, the cantilever is deflected, this deflection is detected by the laser displacement meter and a micro force is calculated based on the detected displacement amount.

CITATION LIST

Patent Literatures

[Patent Literature 1] Japanese Patent Publication No. 3240390
[Patent Literature 2] Japanese Unexamined Patent Application Publication No. 2004-205381

SUMMARY OF INVENTION

Technical Problem

However, the conventional measuring apparatuses disclosed in patent literatures 1 and 2 have had a problem that a measurement range is fixed, unchangeable and narrow. Since the tip swings relative to a surface of the measurement object as the cantilever is more deflected, the displacement amount of the tip and a force applied to the tip are in a nonlinear relationship, wherefore there has been a problem of reducing the measurement range and measurement accuracy.

The present invention was developed in view of such problems and aims to provide a high-accuracy load measuring apparatus capable of enlarging a measurement range.

Solution to Problem

In connection with the problem of a narrow measurement range in conventional measuring apparatuses, the present inventors found out that a measurement range could be enlarged by making a length between a supported position and a loading section (tip) changeable to make a displacement amount of the loading section in response to a force applied to the loading section adjustable, whereby the displacement amount of the loading section is so adjusted according to the magnitude of the force applied to the loading section as to lie in a displacement range measurable by a displacement sensor. Further, in connection with the problem that a displacement amount of a tip and a force applied to the tip are in a nonlinear relationship to reduce the measurement range and measurement accuracy, the present inventors found out that a measurement could be performed with high accuracy by constantly keeping the displacement of the loading section and the force applied to the loading section in a linear relationship independently of the length between the supported position and the loading section. In this way, the present inventors arrived at the present invention.

More specifically, the present invention is directed to a load measuring apparatus, comprising a long and narrow beam member having a loading section provided at one end; a supporting member for supporting the beam member at a side closer to the other end of the beam member than the loading section; and a displacement sensor provided in such a manner as to be able to measure a displacement of the loading section; wherein the beam member includes a pair of long and narrow plate-like leg portions arranged in parallel to each other while being spaced apart in a thickness direction and a connecting portion which connects ends of the respective plate-like leg portions at a side of the loading section and is so supported on the supporting member as to be able to change a length between a supported position by the supporting member and the loading section.

The load measuring apparatus according to the present invention is used as follows. First, when a measurement object comes into contact with the loading section at the one end of the beam member and a force is applied in the thickness direction of the respective plate-like leg portions, the respective plate-like leg portions of the beam member are deflected and the loading section moves in the thickness direction of the respective plate-like leg portions. At this time, since the ends at the loading section side of the pair of long and narrow plate-like leg portions arranged in parallel to each other while being spaced apart in the thickness direction are connected by the connecting portion, the loading section moves while surfaces of the respective plate-like leg portions at the loading section are kept in a state perpendicular to the thickness direction of the respective plate-like leg portions before the displacement. In this way, rotation of the loading section relative to the measurement object can be prevented and the displacement amount of the loading section and the force applied to the loading section can be kept in a linear relationship.

Subsequently, the displacement of the loading section is detected by the displacement sensor and the force applied to the loading section is calculated based on the detected displacement amount. At this time, since the displacement amount of the loading section and the force applied to the loading section are in a linear relationship, the force applied to the loading section can be calculated with higher accuracy than in the case of a nonlinear relationship. Since the loading section does not rotate relative to the measurement object, a wider measurement range can be kept than in the case of rotation depending on the arrangement of the displacement sensor relative to the loading section and the respective plate-like leg portions.

The load measuring apparatus according to the present invention can adjust the displacement amount of the loading section in response to the force applied to the loading section by changing the length between the supported position by the supporting member and the loading section. Thus, the displacement amount of the loading section can be so adjusted as to be located in a displacement range measurable by the displacement sensor according to the magnitude of the force applied to the loading section, and the measurement range can be enlarged. Further, by preparing a plurality of beam members having different stiffnesses beforehand and appropriately exchanging the respective beam members, a displacement amount of the loading section in response to a force of a predetermined magnitude applied to the loading section can be changed, and the measurement range can be further enlarged and flexibly adjusted.

In the case of a single-beam cantilever made of a single plate-like member, the loading section having a force applied thereto rotates relative to a measurement object with a curvature corresponding to a length between a supported position by the supporting member and the loading section when this length is changed. That is, as the length between the supported position by the supporting member and the loading section decreases, the curvature of the rotational motion of the loading section increases and nonlinearity of the displacement amount of the loading section and the force applied to the loading section increases to reduce measurement accuracy. On the contrary, in the load measuring apparatus according to the present invention, since the beam member is such that the ends at the loading section side of the pair of long and narrow plate-like leg portions arranged in parallel to each other while being spaced apart in the thickness direction are connected by the connecting portion, the loading section moves while the surfaces of the respective plate-like leg portions at the loading section are constantly kept in the state perpendicular to the thickness direction of the respective plate-like leg portions before the displacement independently of the length between the supported position by the supporting member and the loading section even if this length is changed. Thus, the displacement amount of the loading section and the force applied to the loading section can be constantly kept in a linear relationship independently of the length between the supported position by the supporting member and the loading section and a measurement can be performed with high accuracy.

Since the beam member is such that the ends at the loading section side of the pair of long and narrow plate-like leg portions arranged in parallel to each other while being spaced apart in the thickness direction are connected by the connecting portion, the respective plate-like leg portions are difficult to deflect and twist in the width direction. Thus, out of the force applied to the loading section, a component of the force acting in the thickness direction of the respective plate-like leg portions can be measured with high accuracy.

In the load measuring apparatus according to the present invention, the displacement sensor preferably includes a capacitive sensor. In this case, since the loading section moves while the surfaces of the respective plate-like leg portions at the loading section are kept in the state perpendicular to the thickness direction of the respective plate-like leg portions before the displacement, the displacement of the loading section can be easily and highly accurately measured as a change in the distances to the surfaces of the respective plate-like leg portions by the capacitive sensor. Thus, a measurement can be performed with sufficient accuracy even without using a displacement meter which has a big construction and utilizes an expensive laser. The load measuring apparatus can be inexpensively manufactured to have a simple construction and a small size as compared with the case of using a displacement meter using a laser. Further, the entire apparatus can be easily integrated.

In the load measuring apparatus according to the present invention, each plate-like leg portion may include a slot, which is a long and narrow hole formed along a length direction in a widthwise central part. In this case, the widths of the respective plate-like leg portions can be widened by the slots of the beam member without changing the geometrical moment of inertia and spring constant of the beam member. Since this can increase torsional stiffness in the width direction of the beam member, torsion of the beam member can be further suppressed. Further, by providing the slots, the stiffness of the beam member can be reduced to make the beam member more easily deflectable and increase sensitivity to a load. By changing the lengths and widths of the slots, a beam member having arbitrary stiffness can be formed.

In the load measuring apparatus according to the present invention, the beam member may be formed by bending opposite end parts of a long and narrow plate-like member in the same direction at right angles to a central part so that the central part forms the connecting portion and the bent opposite end parts form the respective plate-like leg portions, and supported on the supporting member slidably along a length direction of the respective plate-like leg portions; the loading section may include a needle-like tip and be fixed to the one end of the beam member so as to perpendicularly project from a surface of one plate-like leg portion; and the displacement sensor may be capable of measuring a displacement in a projecting direction of the loading section. In this case, the beam member can be easily formed from a single long and narrow plate-like member. Further, the length between the supported position of the beam member by the supporting member and the loading section can be easily adjusted. The force applied to the leading end of the tip of the loading section in the thickness direction of the respective plate-like leg portions can be measured with higher accuracy.

In the load measuring apparatus according to the present invention, there may be a plurality of beam members having different stiffnesses; the beam member having the highest stiffness out of the respective beam members may be calibratable by an existing load sensor; the displacement sensor may be calibratable by the calibrated beam member; and the other beam member(s) may be calibratable by the calibrated beam member and displacement sensor. In this case, since the displacement amounts of the loading sections of the beam members and forces applied to the loading sections are in linear relationships, the respective beam members and the displacement sensor can be calibrated with high accuracy even if the performed calibration is a third-order calibration. Thus, even a beam member which has low stiffness and cannot be calibrated by an existing load sensor can be calibrated with high accuracy.

The load measuring apparatus according to the present invention may further comprise an image pickup unit which is so provided as to be able to pick up images of the loading section before and after a displacement from a width direction of the plate-like leg portions. In this case, a measurement can be performed while a displacement of the loading section is viewed, and an actual state of measurement can be easily confirmed. Thus, the load measuring apparatus is particularly effective when mounted and used in an apparatus for performing a measurement while confirming a displaced state, such as a testing apparatus for a fine material.

Effect of Invention

According to the present invention, it is possible to provide a high-accuracy load measuring apparatus capable of enlarging a measurement range.

DESCRIPTION OF EMBODIMENTS

Hereinafter, an embodiment of the present invention is described with reference to the drawings.

FIGS. 1 to 12 show a load measuring apparatus according to the embodiment of the present invention.

Figure 1:
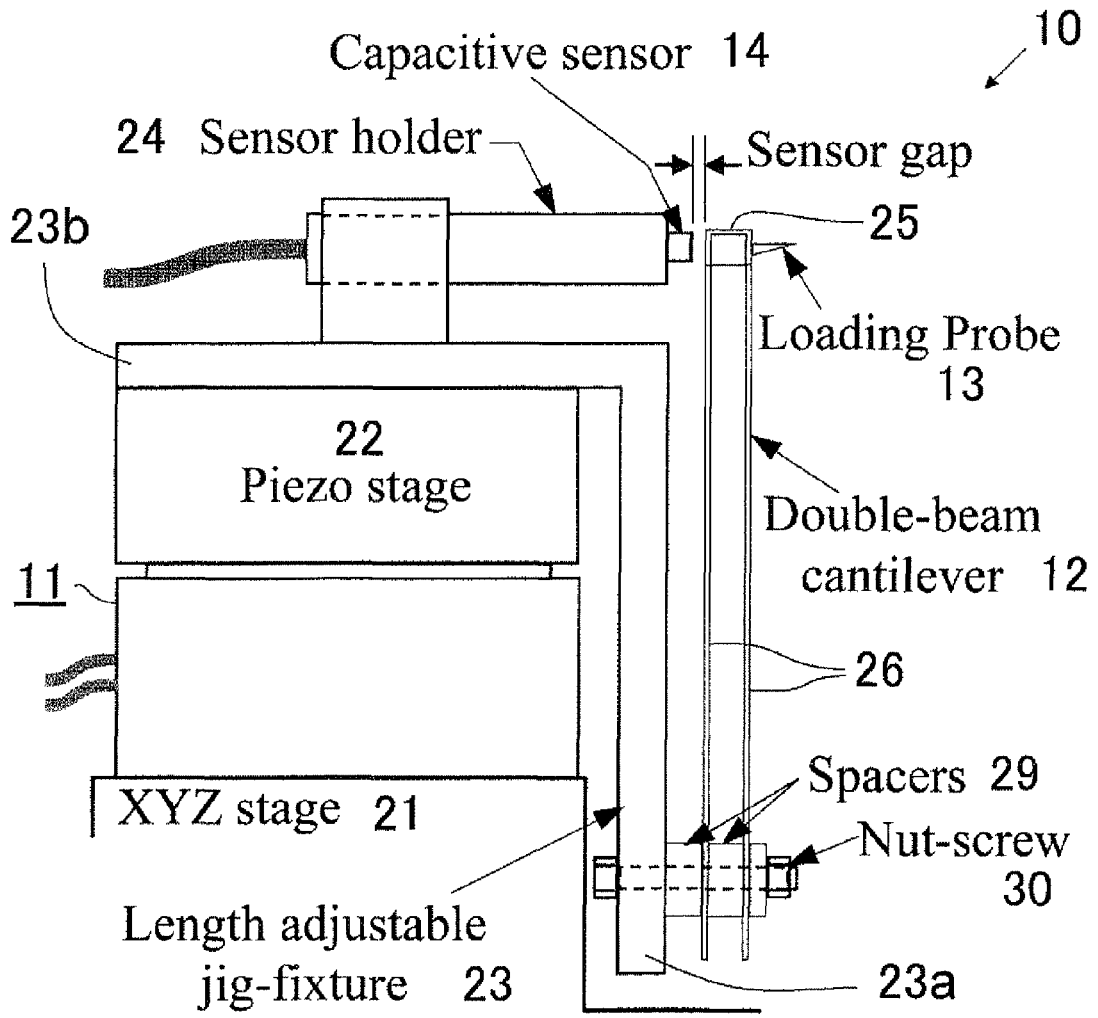
FIG. 1 is a side view showing a load measuring apparatus according to an embodiment of the present invention.
Figure 2:
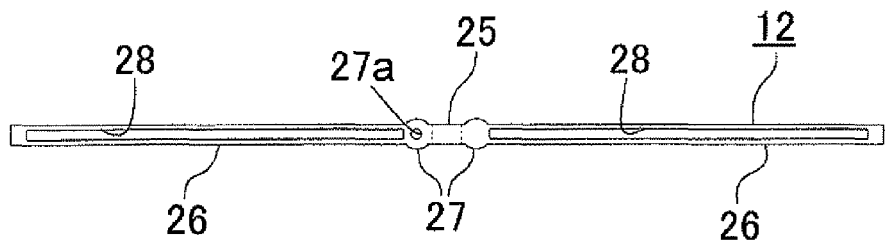
FIG. 2 is a plan view showing a plate-like member forming a beam member of the load measuring apparatus shown in FIG. 1.

As shown in FIGS. 1 and 2, the load measuring apparatus 10 includes a supporting member 11, a beam member 12, a loading section 13 and a displacement sensor 14.

As shown in FIG. 1, the supporting member 11 includes an XYZ stage 21, a piezo stage 22, a length adjustable jig-fixture 23 and a sensor holder 24. The XYZ stage 21 is capable of adjusting a position in horizontal two axis (XY) directions and height (Z) direction. The piezo stage 22 is capable of moving a very short distance in the horizontal two axis (XY) directions with high position accuracy by a computer control. The piezo stage 22 is placed on the XYZ stage 21.

The length adjustable jig-fixture 23 is L-shaped in side view, and other arm part 23b is horizontally placed and mounted on the piezo stage 22 so that one arm part 23a vertically hangs down from the piezo stage 22. The sensor holder 24 is mounted on the other arm part 23b of the length adjustable jig-fixture 23. The sensor holder 24 horizontally extends in a direction toward the one arm part 23a of the length adjustable jig-fixture 23.

As shown in FIG. 2, the beam member (Double-beam cantilever) 12 is a long and narrow stainless plate-like member. The beam member 12 includes a rectangular connecting portion 25 in the center and a pair of long and narrow plate-like leg portions 26 at the opposite end sides. The beam member 12 is formed by bending the respective plate-like leg portions 26 at the opposite end sides in the same direction at right angles to the connecting portion 25 in the center at a dotted-line part in FIG. 2. In this way, the respective plate-like leg portions 26 are arranged in parallel to each other while being spaced apart in a thickness direction, and the connecting portion 25 connects ends of the respective plate-like leg portions 26 at one side.

The beam member 12 includes a pair of circular tip fixing portions 27 at ends of the respective plate-like leg portions 26 at a side of the connecting portion 25. In the beam member 12, a through hole 27a is formed in the center of one tip fixing portion 27. The beam member 12 includes slots 28, which are long and narrow holes formed along a length direction of the respective plate-like leg portions 26 in the widthwise centers of the respective plate-like leg portions 26. In a specific example shown in FIG. 2, the beam member 12 is formed of a member extracted by etching from an 80×50 μm stainless thin plate having a thickness of 100 μm. Further, the connecting portion 25 has a length of about 4 mm and a width of 2 mm. The respective plate-like leg portions 26 have a length of about 41 mm and a width of 2 mm. The tip fixing portions 27 have a diameter of 2.5 mm and the through hole 27a has a diameter of 1 mm.

As shown in FIG. 1, the respective plate-like leg portions 26 of the beam member 12 are mounted to a bottom end portion of the one arm part 23a of the length adjustable jig-fixture 23 of the supporting member 11. The beam member 12 is so mounted that the respective plate-like leg portions 26 vertically extend with the connecting portion 25 located at an upper side. Further, the beam member 12 is so mounted that the thickness direction of the respective plate-like leg portions 26 extends along an extending direction of the sensor holder 24. The beam member 12 is mounted to the length adjustable jig-fixture 23 by a nut-screw 30 with spacers 29 sandwiched, respectively, between the plate-like leg portion 26 closer to the length adjustable jig-fixture 23 and the length adjustable jig-fixture 23 and between the respective plate-like leg portions 26. The beam member 12 is so supported on the supporting member 11 as to be slidable along the length direction of the respective plate-like leg portions 26 by loosening and tightening the nut-screw 30.

As shown in FIG. 1, the loading section (Loading Probe) 13 includes a needle-like tip and is fixed by being inserted through the through hole 27a of the tip fixing portion 27 at the upper end of the beam member 12. The loading section 13 is so fixed by filling a resin between the respective tip fixing portions 27 as to perpendicularly project from a surface of the plate-like leg portion 26 opposite to the length adjustable jig-fixture 23. The loading section 13 is formed, for example, by performing an FIB processing on a tip of a tungsten wire having a diameter of 20 μm and fixed to the beam member 12 using an ultraviolet curing polyester resin.

Note that the beam member 12 is so supported on the supporting member 11 as to be able to change a length between a supported position by the supporting member 11, i.e. a fixed position by the nut-screw 30 and the loading section 13. Further, the beam member 12 is supported on the supporting member 11 at a side lower than the loading section 13.

As shown in FIG. 1, the displacement sensor 14 includes a capacitive sensor and is mounted to the leading end of the sensor holder 24 of the supporting member 11. The displacement sensor 14 is so mounted as to face a surface of an upper end portion of the plate-like leg portion 26 closer to the length adjustable jig-fixture 23 with a sensor gap defined therebetween, and capable of measuring a change in the distance to the surface. This enables the displacement sensor 14 to measure a displacement in a projecting direction of the loading section 13 mounted at a side opposite to the surface, i.e. a displacement in the thickness direction of the respective plate-like leg portions 26. Note that the displacement sensor 14 measures either one or both of a pressing force and a pulling force and an initial sensor gap to the beam member 12 can be changed by the piezo stage 22.

Next, functions are described.

The load measuring apparatus 10 is used as follows. First, when a measurement object comes into contact with the tip of the loading section 13 to apply a force in the thickness direction of the respective plate-like leg portions 26, the respective plate-like leg portions 26 of the beam member 12 are deflected and the loading section 13 moves in the thickness direction of the respective plate-like leg portions 26. At this time, the loading section 13 moves while being kept in a state parallel to the thickness direction of the respective plate-like leg portions 26 before a displacement since the ends of the respective plate-like leg portions 26 at the side of the loading section 13 are rigidly connected by the connecting portion 25 using the resin. In this way, the loading section 13 can be prevented from rotating relative to the measurement object and a displacement amount of the loading section 13 and a force applied to the loading section 13 can be kept in a linear relationship. Further, abrasion between the loading section 13 and a surface of the measurement object can also be prevented.

Subsequently, the displacement of the loading section 13 is detected by the displacement sensor 14 and the force applied to the loading section 13 is calculated based on the detected displacement amount. At this time, since the displacement amount of the loading section 13 and the force applied to the loading section 13 are in a linear relationship, the force applied to the loading section 13 can be calculated with higher accuracy than in the case of a nonlinear relationship. Since the loading section 13 does not rotate relative to the measurement object, a wider measurement range can be kept than in the case of rotation.

Figure 3:
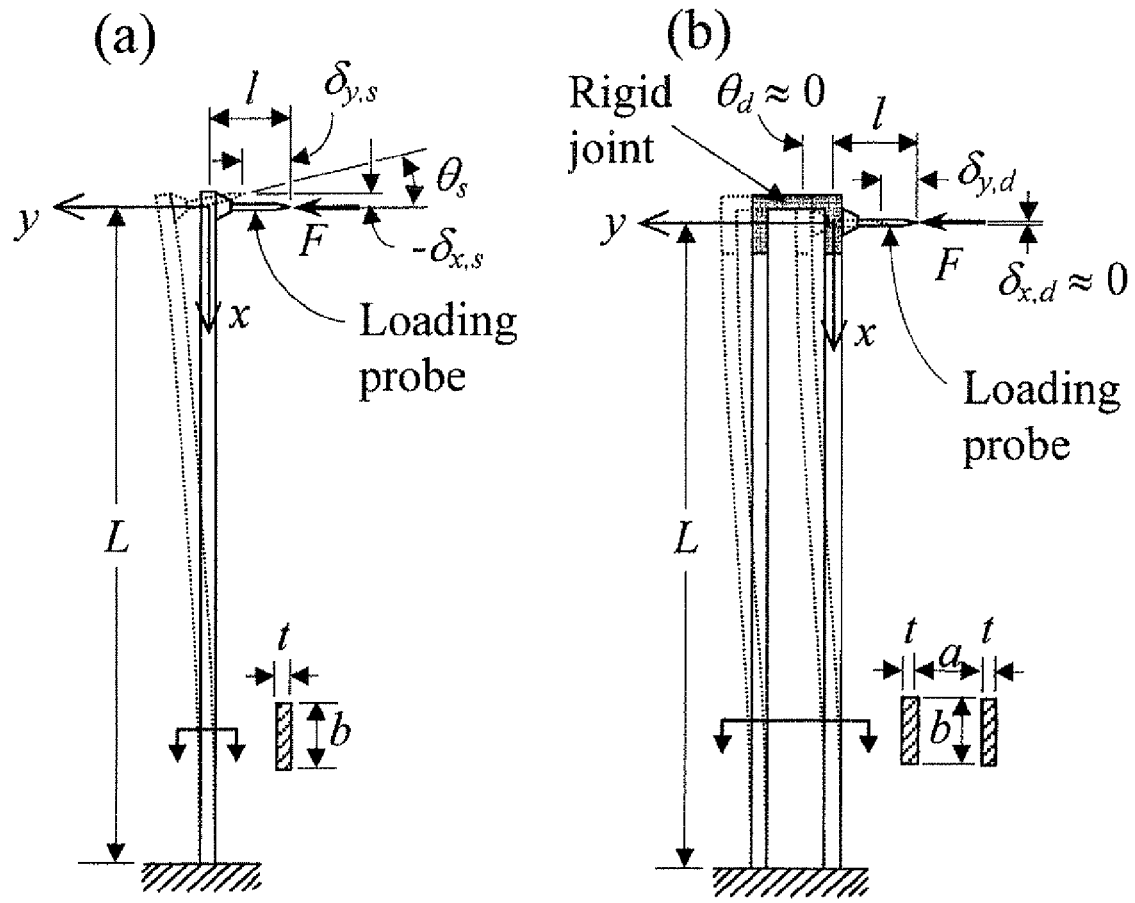
FIG. 3(a) is a side view showing the structure of a conventional load measuring apparatus (single-beam cantilever structure) and FIG. 3(b) is a side view showing the structure of the load measuring apparatus shown in FIG. 1 (double-beam cantilever structure)

These are studied in comparison with a load meter utilized in conventional AFMs and the like. The structure of a conventional load meter (hereinafter, referred to as a "single-beam cantilever structure") is shown in FIG. 3(*a*) and the structure of the load measuring apparatus 10 (hereinafter, referred to as a "double-beam cantilever structure") according to the embodiment of the present invention is shown in FIG. 3(*b*). Here, it is a key to the double-beam cantilever structure that a beam supporting portion at the free end at the side of the connecting portion 25 is a rigid joint.

In an orthogonal coordinate system shown in FIG. 3, a load F acts in a y-direction. In this case, displacements of the single-beam cantilever structure and the double-beam cantilever structure having a length L are respectively given by Equations (1) and (2).

[Equation 1]

$$\delta_{y,s} = \frac{FL^3}{3EI} \quad (1)$$

$$\delta_{y,d} = \frac{FL^3}{24EI} \quad (2)$$

Here, E: Young's modulus
I: geometrical moment of inertia of the cantilever

Deflection angles of the conventional single-beam cantilever structure and the double-beam cantilever structure at neutral axes are respectively given by Equations (3) and (4).

[Equation 2]

$$\delta_s = \frac{3\delta_{y,s}}{2L}(1-\bar{x}^2) \quad (3)$$

$$\delta_d = \frac{6\delta_{y,d}}{L}(\bar{x}-\bar{x}^2) \quad (4)$$

Here, $\bar{x}(=x/L)$: normalized length from the beam free end

From Equation (3), rotation at the free end (x=0) is a maximum of $(\theta_s=1.5\,\delta_{y,s}/L)$ in the conventional single-beam cantilever structure. On the other hand, rotation is zero in the double-beam cantilever structure shown in Equation (4) and the loading section 13 attached near the leading end of the beam member 12 does not rotate.

A displacement of the leading end of a tip attached to the conventional single-beam cantilever structure (corresponding to the loading section 13 of the double-beam cantilever structure) in an x-direction is:

[Equation 3]

$$\delta_{x,s} = \frac{-3\delta_{y,s}l}{2L}. \quad (5)$$

From Equation (5), $\delta_{x,s}/\delta_{y,s}$ is 1.5-fold of 1/L. Normally, a test zone is very small and the tip at the leading end of the cantilever (corresponding to the beam member 12 of the double-beam cantilever structure) is required to have a sufficient length in terms of observation and accessibility. However, lateral movements of the tip should be avoided since they result in a change in a force observation point. On the contrary, a displacement of the tip of the loading section 13 of the double-beam cantilever structure in the x-direction is in the order of $\delta_{y,d}\cdot 10^{-3}$ and negligible.

A measurable sensor gap range is present in the capacitive sensor (CS), but a parallelism between the cantilever and the sensor cannot be kept, thereby reducing a force measurement range and measurement accuracy, when the single-beam cantilever structure is deflected. If d denotes the diameter of the capacitive sensor, a possible deflection $(\delta_m)$ of the single-beam cantilever structure is given by Equation (6).

[Equation 4]

$$\delta_m + \frac{d}{2}\tan\left(\frac{3\delta_m}{2L}\right) = \delta_g \quad (6)$$

Here, $\delta_g$: sensor gap range measurable by the sensor

Figure 4:
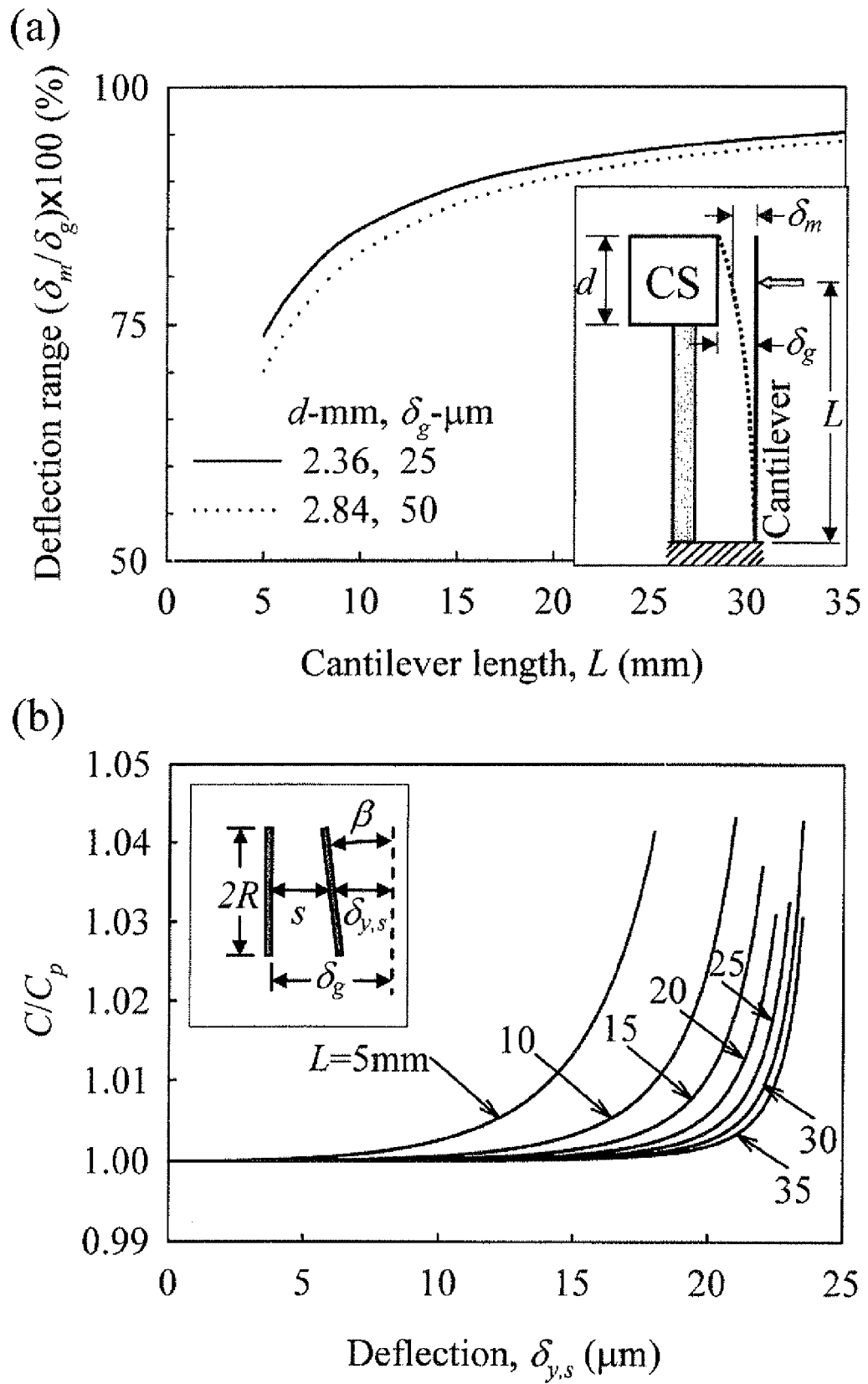
FIG. 4(a) is a graph showing a relationship between cantilever length (L) and usable deflection range of the single-beam cantilever structure shown in FIG. 3(a) and FIG. 4(b) is a graph showing relationships between specific capacitance ($C/C_P$) and deflection ($\delta_{y,s}$) of beams having various lengths (L)

An example of a usable deflection range, $(\delta_m/\delta_g)\times 100$, of the single-beam cantilever structure is shown in FIG. 4(*a*) as a function of the cantilever length L. Here, calculation is made for d=2.36 and 2.84 mm and $\delta_g$=25 and 50 μm. As shown in FIG. 4(a), the usable sensor range is found to be smaller as L decreases. On the other hand, in the double-beam cantilever structure, a usable sensor range is constantly 100% independently of L.

The capacitive sensor measures a sensor gap utilizing a capacitance change between the sensor and a conductor arranged in parallel to the sensor. Here, if a parallelism between the sensor and the conductor decreases, deviation is made from a proportional relationship between the sensor gap and the capacitance change, and this nonlinear behavior leads to a sensor gap measurement error, i.e. a force measurement error. The capacitance change in a system in which two conductors are separated can be approximated by Equation (7).

[Equation 5]

$$\frac{C}{C_P} = \frac{s}{2}\int_0^R \frac{1}{b}\ln\left(\frac{s+b}{s-b}\right)dr \quad (7)$$

$$s = \delta_g - \delta_{y,s}$$

$$b = \frac{3\delta_{y,s}}{2L}\sqrt{R^2 - r^2}$$

Here, $C_P$: capacitance for perfectly parallel conductors
R: radius of a sensor part FIG. 4(b) shows a theoretically calculated relationship between $C/C_p$ and deflection ($\delta_{y,s}$) of the single-beam cantilever structure. Here, it was assumed that R=0.535 mm and $\delta_g$=25 μm. As shown in FIG. 4(b), $C/C_P$ is found to increase as $\delta_{y,s}$ increases or L decreases. It is also found that the sensor gap is erroneously measured and force measurement accuracy decreases in a range where $C/C_p$ is not in a proportional relationship with $\delta_{y,s}$. On the other hand, since the beam member 12 and the capacitive sensor are constantly kept parallel in the double-beam cantilever structure, $C/C_p$ is constantly 1 and the force measurement accuracy is not reduced in the measurement range.

In the case of the single-beam cantilever structure, if the length between the supported position of the cantilever and the tip, i.e. the cantilever length L is changed, the tip having a force applied thereto rotates relative to the measurement object with a curvature corresponding to the length as shown in FIG. 4(b). That is, as the length between the supported position of the cantilever and the tip decreases, the curvature of the rotational motion of the tip increases and nonlinearity of the displacement amount of the tip and the force applied to the tip increases to reduce the measurement accuracy. On the contrary, in the double-beam cantilever structure, even if the length between the supported position by the supporting member 11 and the loading section 13 is changed, the loading section 13 moves while being constantly kept in the state parallel to the thickness direction of the respective plate-like leg portions 26 before the displacement independently of the length. Thus, the displacement amount of the loading section 13 and the force applied to the loading section 13 can be constantly kept in a linear relationship independently of the length between the supported position by the supporting member 11 and the loading section 13, wherefore a measurement can be performed with high accuracy.

As described above, since the loading section 13 moves while being constantly kept in the state parallel to the thickness direction of the respective plate-like leg portions 26 before the displacement without rotating relative to the measurement object in the load measuring apparatus 10, the displacement of the loading section 13 can be easily and highly accurately measured as a change in the distances to the surfaces of the respective plate-like leg portions 26 by the capacitive sensor. Thus, a measurement can be performed with sufficient accuracy even without using a displacement meter which has a big construction and utilizes an expensive laser. The load measuring apparatus 10 can be inexpensively manufactured to have a simple construction and a small size as compared with the case of using a displacement meter using a laser. Further, the entire apparatus can be easily integrated.

The load measuring apparatus 10 can easily and freely change the length between the supported position by the supporting member 11 and the loading section 13 by a simple screw mechanism utilizing the nut-screw 30. Thus, without exchanging the beam member 12, the displacement amount of the loading section 13 in response to the force applied to the loading section 13 can be adjusted. Therefore, the displacement amount of the loading section 13 can be so adjusted according to the magnitude of the force applied to the loading section 13 as to lie in a displacement range measurable by the displacement sensor 14, wherefore the measurement range can be enlarged.

Note that, by preparing a plurality of beam members 12 having different stiffnesses beforehand and appropriately exchanging the respective beam members 12, the displacement amount of the loading section 13 in response to a force of a predetermined magnitude applied to the loading section 13 can be changed and the measurement range can be further enlarged and flexibly adjusted.

In the load measuring apparatus 10, the widths of the respective plate-like leg portions 26 can be widened by providing the slots 28 of the beam member 12 without changing the geometrical moment of inertia and spring constant of the beam member 12. Since this can increase torsional stiffness in the width direction of the beam member 12, torsion of the beam member 12 can be further suppressed and the capacitive sensor of the displacement sensor 14 and the plate-like leg portions 26 can be kept in parallel. Thus, a force applied to the loading section 13 can be measured with high accuracy. Further, by providing the slots 28, the stiffness of the beam member 12 can be reduced to make the beam member 12 more easily deflectable and increase sensitivity to a load. By changing the lengths and widths of the holes, the beam member 12 having arbitrary stiffness can be formed.

Note that the stiffness k of the beam member 12 is given by Equation (8). Since k depends on L from Equation (8), the beam member 12 having a desired k can be easily obtained utilizing this property.

[Equation 6]

$$k = \frac{24EI}{L^3} \quad (8)$$

Note that the load measuring apparatus 10 may include an image pickup unit which is so provided as to be able to pick up images of the loading section 13 before and after a displacement from the width direction of the plate-like leg portions 26. In this case, a measurement can be performed while the displacement of the loading section 13 is viewed and, hence, an actual state of measurement can be easily confirmed. Thus, the load measuring apparatus 10 is particularly effective when mounted and used in apparatus for performing a measurement while confirming a displaced state, such as a testing apparatus for a fine material.

Example 1

Two types of capacitive sensors having measurement ranges of 25 μm and 50 μm were used as the displacement sensor 14. Output voltages were respectively 0.4 V/μm and 0.2 V/μm. By exchanging these two types of capacitive sensors, a measurement range of force can be changed. Further, a cantilever having a stiffness (k-value) of 10 μN/μm (hereinafter, referred to as "Cant.-1") and a cantilever having a stiffness of 1 μN/μm (hereinafter, referred to as "Cant.-2") were fabricated as the beam member 12. The k-value was calculated by Equation (8), assuming E=207 GPa. Dimensional details of the both cantilevers are shown in Table-1.

TABLE 1

| Parameter | Cant.-1 | Cant.-2 |
|---|---|---|
| a (mm) | 3 | 3 |
| h-c (mm) | 0.8 | 0.544 |
| t (mm) | 0.10 | 0.05 |
| l (mm) | 6 | 6 |
| L (mm) | 31.6 | 29.5 |
| Expected, $k^{b)}$ (μN/μm) | 10.5 | 1.10 |

[b)]The value of E was assumed as 207 GPa

Figure 5:
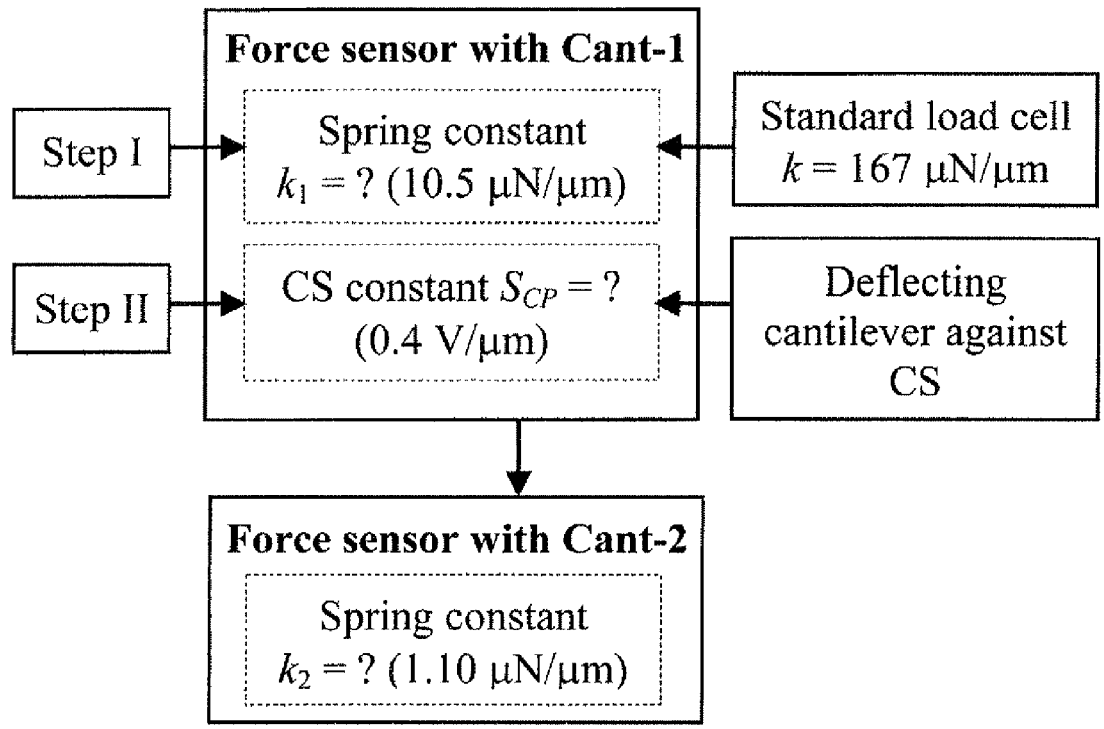
FIG. 5 is a block diagram showing a method for calibrating the beam member of the load measuring apparatus shown in FIG. 1.

As shown in FIG. 5, the cantilevers were calibrated in two steps. In step I, k of the Cant.-1 having a larger k is actually measured using a commercially available load sensor (minimum detectable load is large) and, subsequently, the capacitive sensor is calibrated using this Cant.-1. In step II, the Cant.-2 having a smaller k is calibrated using the calibrated Cant.-1.

[Calibration of Cant.-1]

Figure 6:
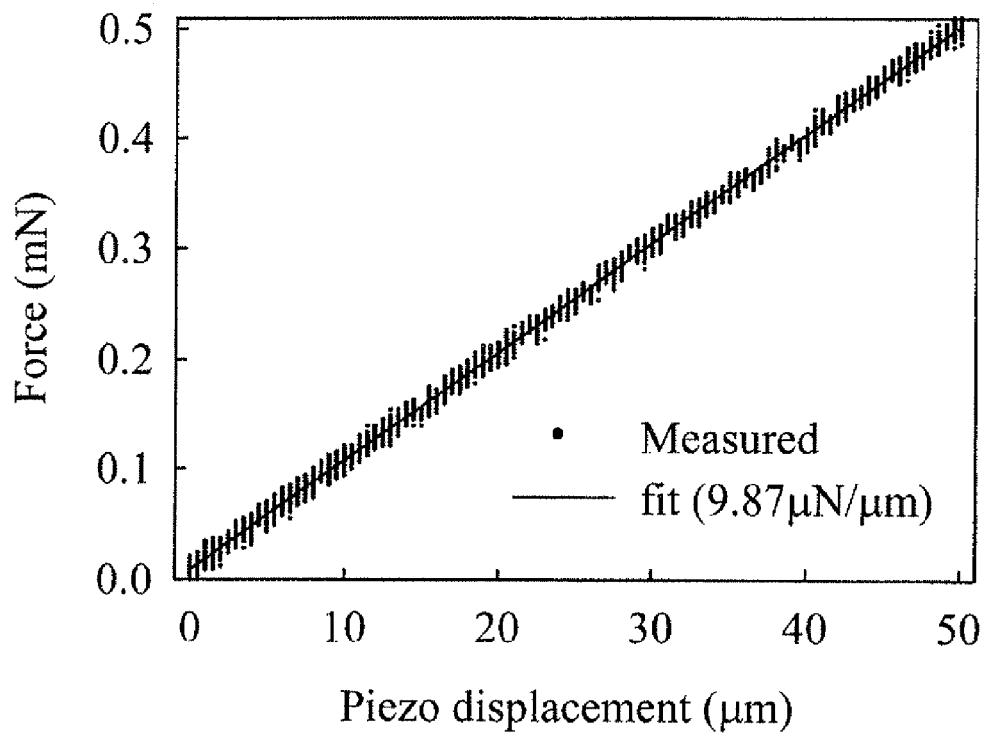
FIG. 6 is a graph showing a relationship between given piezo displacement and force of the beam member in step I of the calibration method shown in FIG. 5.

The Cant.-1 was calibrated using a commercially available load sensor (measurement range: 20 mN, accuracy: 0.025 mN). A force of the beam detected by the capacitive sensor when a piezo displacement was given to the leading end of the cantilever by the piezo stage 22 up to 50 μm in increments of 1 μm is shown in FIG. 6. A force of 0.5 mN was generated for a displacement of 50 μm. This is only 2.5% of the measurement range of the used capacitive sensor. The gradient of a fit curve obtained through the least squares approximation of obtained data was 9.87 μN/μm. The stiffness of the load cell was 167 μN/μm and the stiffness of the Cant.-1 was calculated to be $k_1$=10.5 μN/μm in view of the deformation of the load cell.

Figure 7:
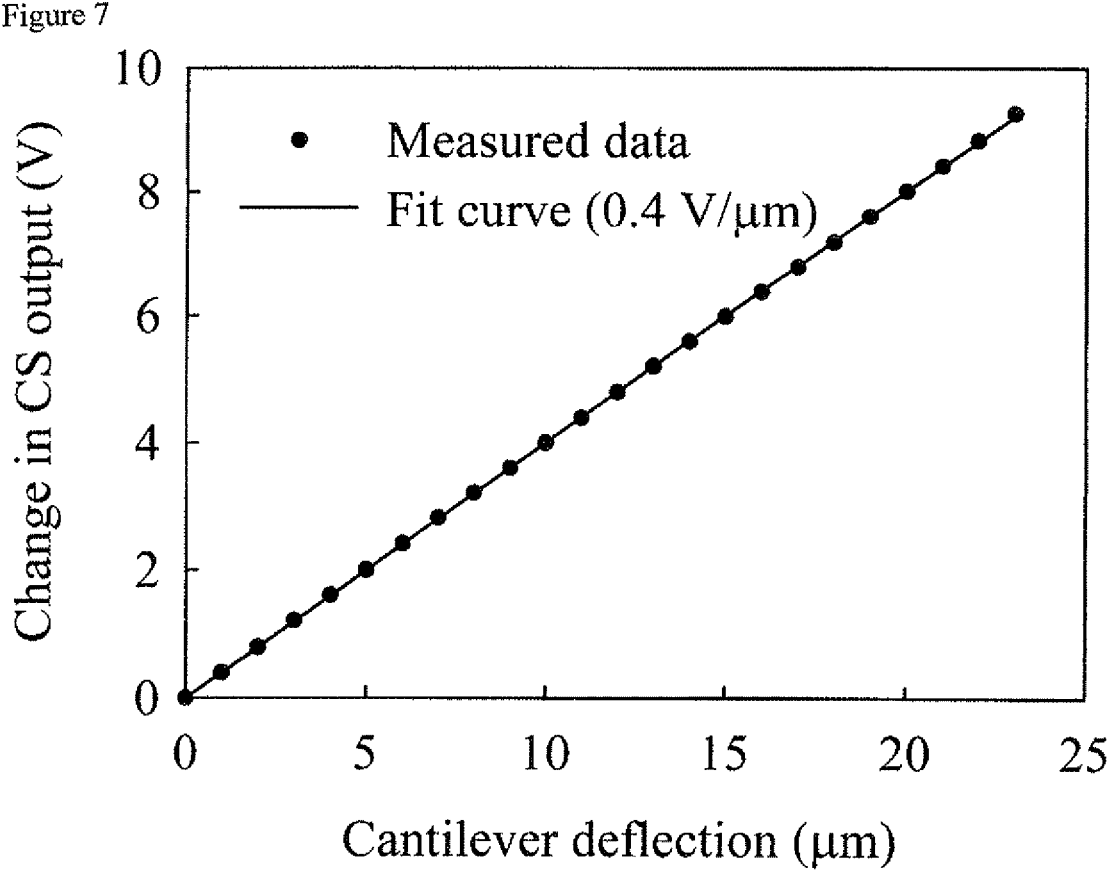
FIG. 7 is a graph showing a relationship between cantilever deflection and a change in capacitive sensor (CS) output in step I of the calibration method shown in FIG. 5, FIGS. 8(a) and 8(b) are graphs showing a relationship between given piezo displacement ($\delta_{PZT}$) and capacitive sensor (CS) output ($\Delta V$) and a relationship between deflection of Cant.-1 and Cant.-2 and load (force) in step II of the calibration method shown in FIG. 5.
Figure 8:
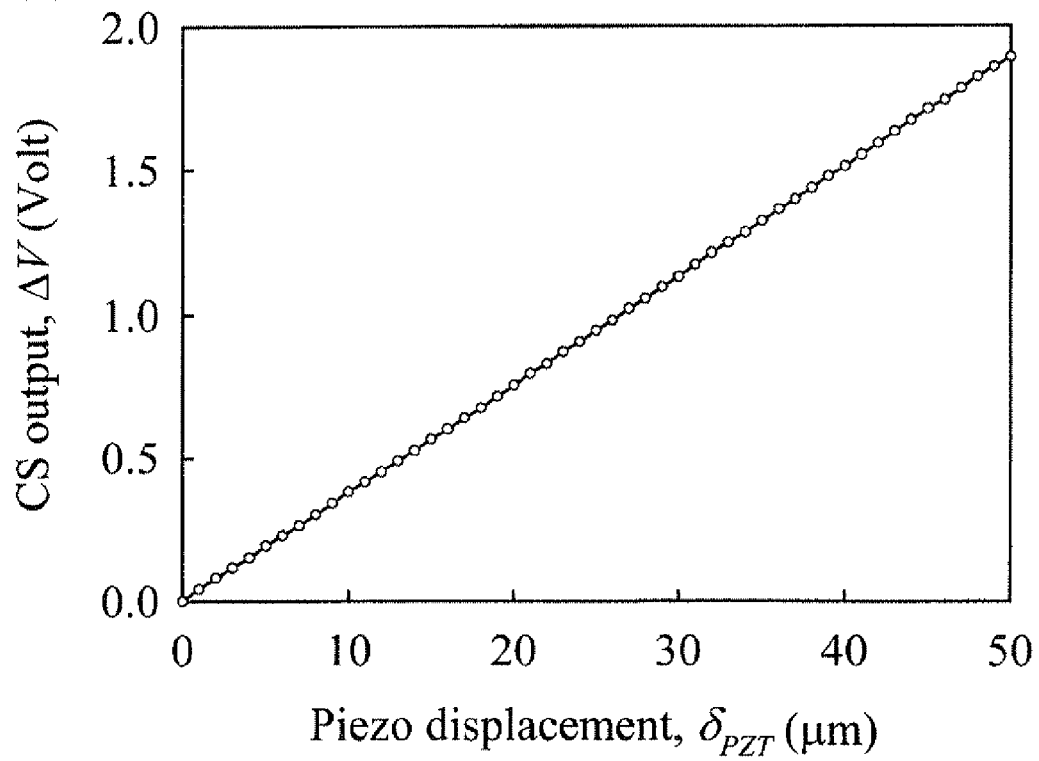
Figure 8:
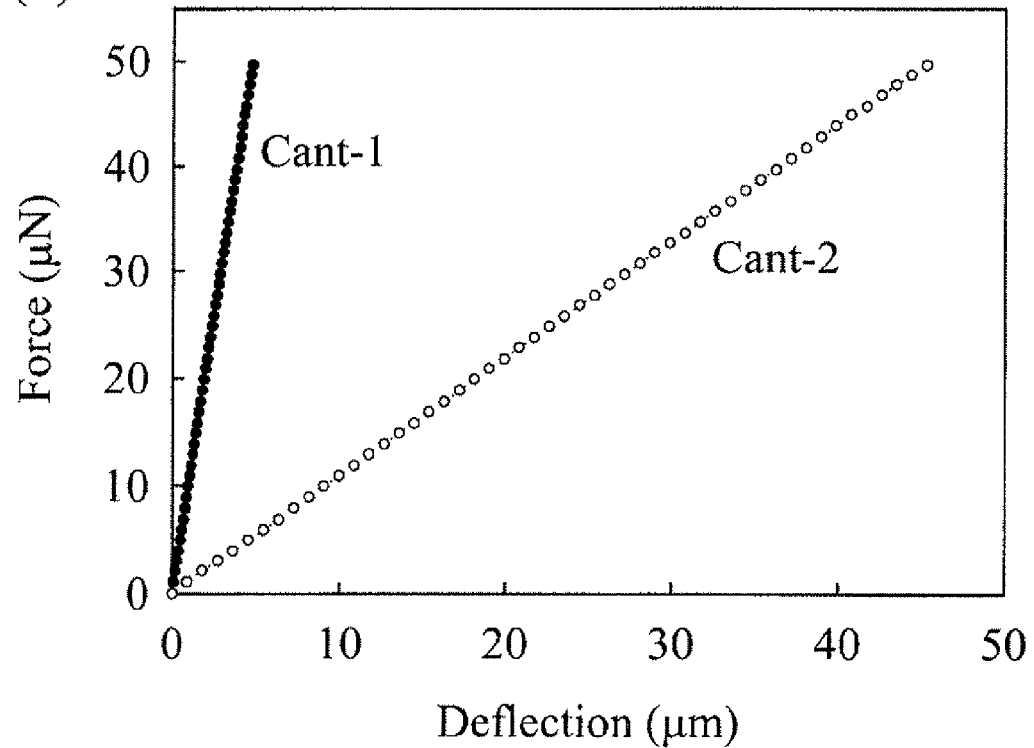

The calibrated cant.-1 and the capacitive sensor (measurement range: 25 μm) were arranged with a sensor gap defined therebetween. A relationship between change in capacitive sensor (CS) output and cantilever deflection when piezo displacements were given to the Cant.-1 by the piezo stage 22 is shown in FIG. 7. Through the least squares approximation of experimental data, a capacitive sensor constant was calculated to be $S_{CP}$=0.4 V/μm. In the case of combining the capacitive sensor having a range of 25 μm and the Cant.-1, force measurement sensitivity is 26.25 μN/V and a force measurement range for a capacitive sensor output of 0 to 10 V is 0 to 262.5 μN. As a matter of course, a force measurement range in the case of combining the Cant.-1 and the capacitive sensor having a doubled measurement range of 50 μm is doubled.

[Calibration of Cant.-2]

For the calibration of the Cant.-2, the already calibrated Cant.-1 is used. The Cant.-2 was fixed and the leading end thereof was loaded by the Cant.-1 mounted on the piezo stage 22. FIG. 8(a) shows a relationship between piezo displacement $\delta_{PZT}$ of the piezo stage 22 and capacitive sensor (CS) output (ΔV). A good linear relationship is confirmed between both. A force F loaded to the leading end by the Cant.-1, a deflection $\delta_1$ of the cant.-1 and a deflection $\delta_2$ of the Cant.-2 are respectively given by Equations (9) to (11).

[Equation 7]

$$F = k_1 \Delta V / S_{CP} \tag{9}$$

$$\delta_1 = \Delta V / S_{CP} \tag{10}$$

$$\delta_2 \pm \delta_{PZT} - \Delta V / S_{CP} \tag{11}$$

Here, $k_1$: Stiffness of Cant.-1 (10.5 μN/μm)
$S_{CP}$: capacitive sensor sensitivity (0.4 V/μm)

A relationship between deflection of the Cant.-1 and Cant.-2 and load (force) obtained from an experimental result is shown in FIG. 8(b). A good linear relationship is confirmed for both cantilevers. In this way, k of the Cant.-2 was calculated to be 1.10 μN/μm. Predicted values of k for the both cantilevers were shown in Table-1. Actual measurement values and the predicted values fit well. Since the displacement amount of the loading section 13 of each cantilever and the force applied to the loading section 13 are in a linear relationship as described above, each cantilever and the capacitive sensor can be calibrated with high accuracy. Therefore, even a cantilever which has a small stiffness and cannot be calibrated by existing load sensors can be calibrated with high accuracy.

In the case of combining the capacitive sensor having a range of 25 μm and the Cant.-2, force measurement sensitivity is 2.75 μN/V and a force measurement range for a capacitive sensor output of 0 to 10 V is 0 to 27.5 μN. Of course, the force measurement range can be easily changed by controlling the deflection of a double cantilever. For example, if the length of the double cantilever is 5.9 mm (⅕ of the entire length), k is 137.5 μN/μm (=1.10×5³) from Equation (8) and the measurement range is 125-fold. Further, concerning force measurement accuracy, a minimum measurable force realized by the arrangement of this experiment and the Cant.-2 is estimated to be approximately 100 nN.

[Measurement Range]

When a maximum displacement detectable by the capacitive sensor is $\delta_{y,d}$, a measurable maximum force ($F_{max}$) is calculated by Equation (12).

[Equation 8]

$$F_{max} = \frac{24EI\delta_{y,d}}{L^3} \tag{12}$$

Figure 9:
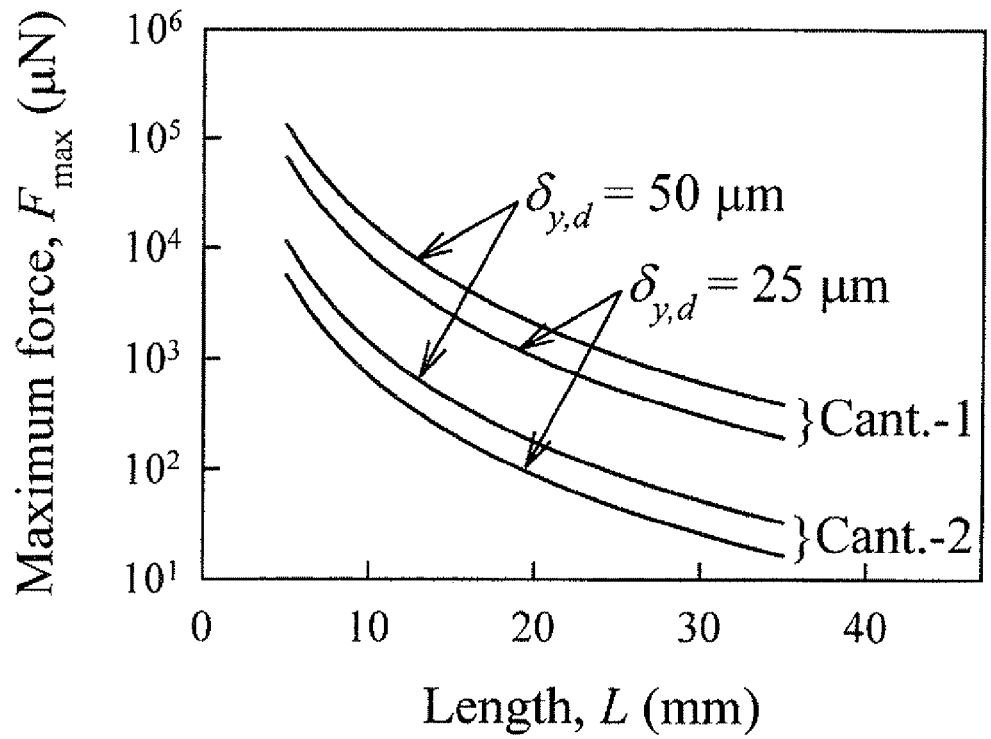
FIG. 9 is a graph showing relationships between length (L) between a supported position by a supporting member and a loading section and measurable maximum force ($F_{max}$) of the Cant.-1 and Cant.-2, which are beam members of the load measuring apparatus shown in FIG. 1, when two types of capacitive sensors having different detectable maximum deflections ($\delta_{y,d}$) are used.

$F_{max}$ in the case of using the Cant.-1 and Cant.-2 is shown as a function of the length L between the supported position by the supporting member 11 and the loading section 13 in FIG. 9. $F_{max}$ varies from 10 μN to 0.1 N in the range of L shown in FIG. 9. In this case, a measurable force range is 0 to $F_{max}$. As $F_{max}$ decreases, a minimum force detectable by the capacitive sensor for a minimum detectable displacement decreases and force resolution is improved. Thus, it is preferable to perform force sensing under suitable $F_{max}$ for a target force range.

Example 2

Figure 10:
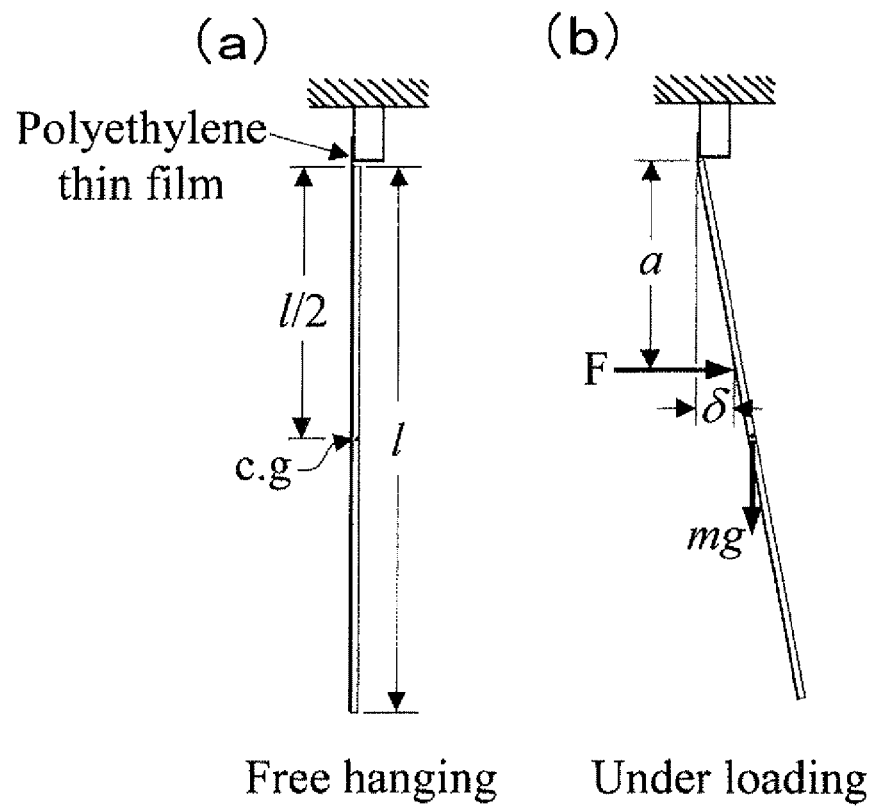
FIGS. 10(a) and 10(b) are side views showing a free hanging state and a state under loading with a given displacement ($\delta$) of a pendulum used in a micro force measurement experiment of the load measuring apparatus shown in FIG. 1.

Using a small pendulum shown in FIG. 10, an experiment on micro force measurement was conducted. The pendulum is made of metal, has a length of 66 mm, a width of 1.5 mm and a thickness of 100 μm, and is suspended on a fixing jig using a polyethylene thin film. A gravitational force acts on this pendulum, but a point of action (center of gravity, c.g) thereof is located in the center of the pendulum. The Cant.-2 was used in the experiment and a force when a piezo displacement was given in increments of 1.0 μm by the piezo stage 22 at a distance "a" from the upper end of the pendulum was measured. "a" takes three values of 5.8 mm, 10.3 mm and 19.8 mm and a measurement was also performed for a process of giving a displacement in an opposite direction at the distance "a"=19.8 mm.

Figure 11:
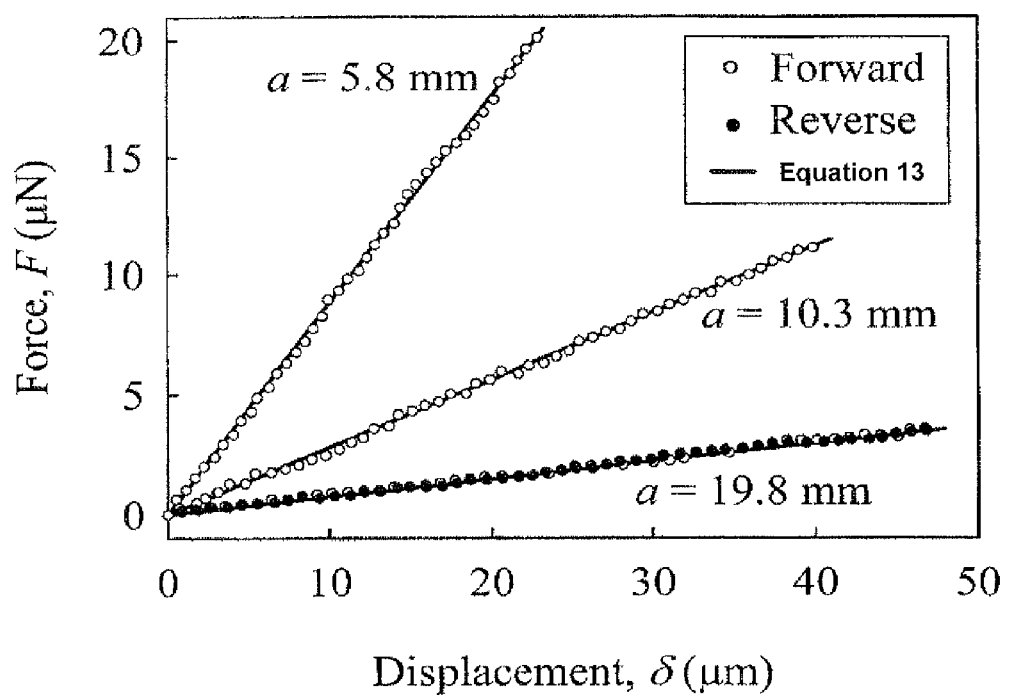
FIG. 11 is a graph showing relationships between force (F) and displacement ($\delta$) of results of the micro force measurement experiment using the pendulum shown in FIG. 10 with the load measuring apparatus shown in FIG. 1, and FIGS. 12(a) and 12(b) are a graph showing relationships between displacements ($\delta$) of beam members and loads (F) and a graph showing a relationship between displacement ($\delta$) of the beam member and $FL^3/(3I)$ of results of a bending test using human hairs by the load measuring apparatus shown in FIG. 1.

FIG. 11 shows relationships (F-δ relationships) between force (F) and displacement (δ) obtained by the experiment. As shown in FIG. 11, it was confirmed that the force decreased as "a" increased. Particularly, in the experiment in which "a"=19.8 mm, it was confirmed that a micro force in the range of 0 to 3.5 μm could be accurately detected. Further, a measurement result in the case of giving a displacement in the opposite direction (Reverse) fitted well with that of the forward direction (Forward) and it could also be confirmed that measurement reproducibility is excellent.

Force (F) is theoretically given by Equation (13).

[Equation 9]

$$F = \left(\frac{mgl}{2a^2}\right)\delta \qquad (13)$$

Here, g: gravitational acceleration m: mass of the pendulum (=0.0914×10$^{-3}$ kg)

Theoretical values by Equation (13) for three cases ("a"=5.8, 10.3 and 19.8 mm) are also shown by solid line in FIG. 11. The experimental values fit well with the theoretical values.

Example 3

Figure 12:
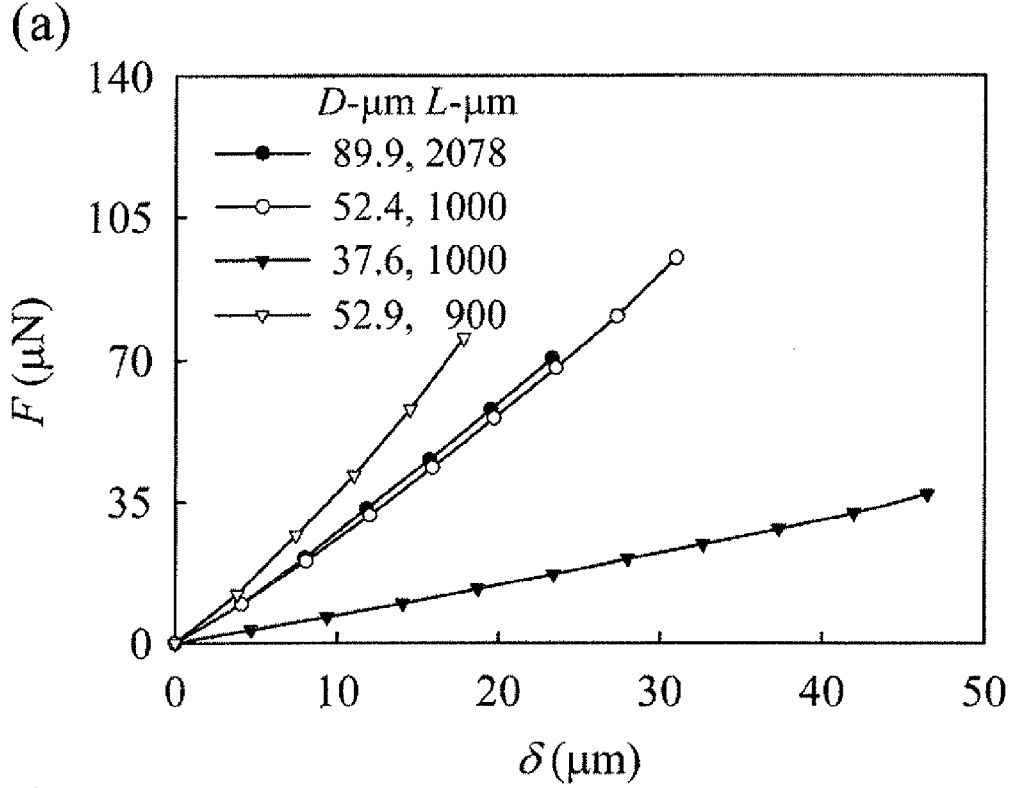
Figure 12:
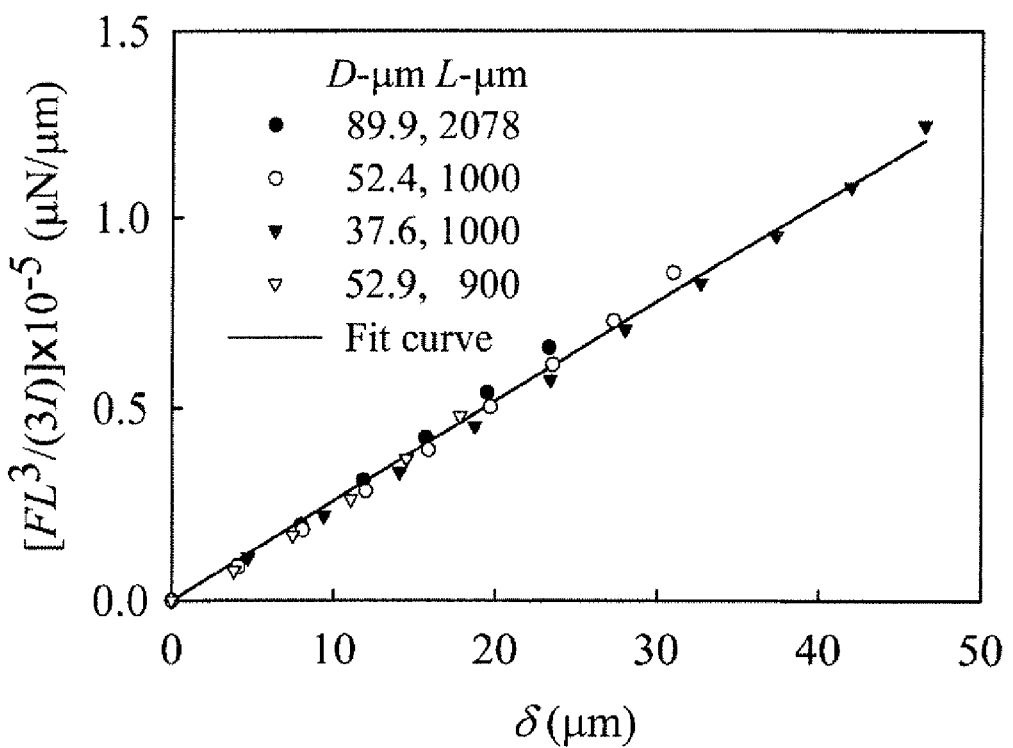

A bending test was conducted for four human hair samples having different diameters. These samples are fixed to needle tips by a photo-curing resin. (Diameter D and fixed length L) of each sample was (89.9 μm, 2078 μm), (52.4 μm, 1000 μm), (37.6 μm, 1000 μm) and (52.9 μm, 900 μm). The Cant.-1 was used in the experiment. A relationship between obtained displacement (Δ) and load (F) is shown in FIG. 12($a$). As shown in FIG. 12($a$), it was confirmed that bending behaviors of the human hair samples were linear and elastic.

Further, as shown in FIG. 12($b$), the elastic modulus of the human hair is given by the gradient of a relationship $FL^3/(3I)$–δ. Here, $I=\pi D^4/64$. As shown in FIG. 12($b$), it was confirmed that a relationship of four different human hairs could be approximated by one straight line and the elastic modulus thereof was 2.6±0.1 GPa.

To date, load measuring apparatuses suitable for measuring forces in an mN range and an nN range have existed as those capable of measuring micro forces, but there have been no high-accuracy load measuring apparatuses suitable for measuring forces in a μN range as an intermediate range. On the contrary, the load measuring apparatus 10 according to the embodiment of the present invention is a measuring apparatus of a previously unavailable and fully new type which can highly accurately and easily measure forces in the μN range and is most suitable for measuring forces in the μN range.

REFERENCE SIGNS LIST 10 load measuring apparatus
11 supporting member
12 beam member
13 loading section
14 displacement sensor
21 XYZ stage
22 piezo stage
23 length adjustable jig-fixture
24 sensor holder
25 connecting portion
26 plate-like leg portion
27 tip fixing portion
28 slot
29 spacer
30 nut-screw

The invention claimed is:

1. A load measuring apparatus, comprising:
a long and narrow beam member having a loading section provided at one end;
a supporting member for supporting the beam member at a side closer to the other end of the beam member than the loading section; and
a displacement sensor provided in such a manner as to be able to measure a displacement of the loading section, wherein:
the beam member includes a pair of long and narrow leg portions arranged in parallel to each other while being spaced apart in a thickness direction and a connecting portion which connects ends of the respective leg portions at a side of the loading section, the beam member including bent opposite end parts of a long and narrow member bent in a same direction at right angles to a central part so that the central part forms the connecting portion and the bent opposite end parts form the respective leg portions, the beam member is slidably supported on the supporting member along a length direction of the respective leg portions so as to be able to change a length between a supported position by the supporting member and the loading section;
the loading section includes a needle-shaped tip and is fixed to the one end of the beam member so as to perpendicularly project from a surface of one of the leg portions; and
the displacement sensor is adapted to measure a displacement in a projecting direction of the loading section.

2. The load measuring apparatus according to claim 1, wherein
the displacement sensor includes a capacitive sensor, the load measuring apparatus is adapted to change a measurable maximum force from 10 μN to 0.1 N, and is used for a human hair bending test.

3. The load measuring apparatus according to claim 1, wherein:
each of the leg portions has a long and narrow rectangular shape and includes a slot, which is a long and narrow hole formed along a length direction in a widthwise central part;
the beam member includes a pair of circular tip fixing portions at ends of the respective leg portions at a side of the connecting portion, one tip fixing portion being formed with a through hole in the center; and
the loading section is fixed by being inserted through the through hole.

4. The load measuring apparatus according to claim 1, wherein:
- the beam member comprises a plurality of beam members having different stiffnesses;
- one of the beam members having the highest stiffness out of the respective beam members is configured to be calibrated by an existing load sensor;
- the displacement sensor is configured to be calibrated by the calibrated one of the beam members; and
- the plurality of beam members other than the calibrated one of the beam members are configured to be calibrated by the calibrated beam member and the displacement sensor.

5. The load measuring apparatus according to claim 1, further comprising
- an image pickup unit which is configured to pick up images of the loading section before and after a displacement from a width direction of the leg portions.

6. The load measuring apparatus according to claim 1, wherein:
- the beam member is made of a member extracted by etching from a stainless thin plate having a thickness of 100 µm; and
- the loading section is formed by performing an FIB processing on a tip of a tungsten wire having a diameter of 20 µm and fixed to the beam member using an ultraviolet curing polyester resin.

\* \* \* \* \*